US010456807B2

(12) United States Patent
Russo, II et al.

(10) Patent No.: US 10,456,807 B2
(45) Date of Patent: Oct. 29, 2019

(54) BEAD-APEX ASSEMBLY SYSTEMS

(71) Applicants: BARTELL MACHINERY SYSTEMS, L.L.C., Rome, NY (US); THE STEELASTIC COMPANY LLC, Cuyahoga Falls, OH (US)

(72) Inventors: John R. Russo, II, Marcy, NY (US); Christopher L. Johnson, Blossvale, NY (US); Paul D. Gatley, Holland Patent, NY (US); Marek J. Kos, Stow, OH (US); Eric W. Gorham, Akron, OH (US); Mark Marabito, Medina, OH (US); Thomas D. Miller, Barberton, OH (US); Rosemarie Fisher, Medina, OH (US); Donald L. Matthews, Southington, OH (US)

(73) Assignees: Bartell Machinery Systems, L.L.C., Rome, NY (US); The Steelastic Company LLC, Cuyahoga Falls, OH (US)

( * ) Notice: Subject to any disclaimer, the term of this patent is extended or adjusted under 35 U.S.C. 154(b) by 397 days.

(21) Appl. No.: 14/944,890

(22) Filed: Nov. 18, 2015

(65) Prior Publication Data
US 2016/0144398 A1 May 26, 2016

Related U.S. Application Data

(60) Provisional application No. 62/084,294, filed on Nov. 25, 2014.

(51) Int. Cl.
*B05C 21/00* (2006.01)
*B29D 30/48* (2006.01)
(Continued)

(52) U.S. Cl.
CPC ............... *B05D 1/36* (2013.01); *B05C 21/00* (2013.01); *B29D 30/48* (2013.01);
(Continued)

(58) Field of Classification Search
CPC .................. B29D 2030/482; B29D 2030/0044
See application file for complete search history.

(56) References Cited

U.S. PATENT DOCUMENTS 4,354,892 A   10/1982  Tarantola et al.
4,795,522 A *  1/1989  Orendorf ............... B29D 30/50
                                                156/136
(Continued)

FOREIGN PATENT DOCUMENTS

WO         WO92/11131          7/1992

OTHER PUBLICATIONS

Examination Report for EP15196096.0 dated Mar. 24, 2017, 5 pgs.
(Continued)

*Primary Examiner* — Binu Thomas
(74) *Attorney, Agent, or Firm* — Brinks Gilson & Lione

(57) ABSTRACT

A bead-apex assembly system comprising a bead forming system and an apex application system. In one embodiment, a supporting assembly is located at least partially between the bead forming system and the apex application system, and the supporting assembly is adapted to move an annular bead ring from the bead forming system to the apex application system.

5 Claims, 8 Drawing Sheets

(51) Int. Cl.
   *B05D 1/36* (2006.01)
   *B29D 30/00* (2006.01)
(52) U.S. Cl.
   CPC .............. *B29D 2030/0044* (2013.01); *B29D 2030/482* (2013.01); *B29D 2030/487* (2013.01)

(56) References Cited

U.S. PATENT DOCUMENTS

| | | | | |
|---|---|---|---|---|
| 5,100,497 A | | 3/1992 | Moody et al. | |
| 5,203,938 A | * | 4/1993 | Moody | B29D 30/48 156/136 |
| 5,336,358 A | * | 8/1994 | Kawaguchi | B29D 30/50 156/396 |
| 5,391,342 A | | 2/1995 | Moody et al. | |
| 5,632,836 A | * | 5/1997 | Verschoor | B29D 30/48 156/111 |
| 6,328,835 B1 | * | 12/2001 | Kobayashi | B29D 30/48 156/111 |
| 6,363,988 B1 | * | 4/2002 | Yasufuku | B29D 30/48 156/396 |
| 2012/0024480 A1 | * | 2/2012 | Matsuyama | B29D 30/48 156/350 |
| 2014/0161584 A1 | * | 6/2014 | Kohnen | B29D 30/48 414/806 |
| 2014/0265400 A1 | | 9/2014 | Gorham | |

OTHER PUBLICATIONS

Extended European Search Report for 15196096.0 dated Apr. 12, 2016, 8 pgs.
Response to Examination Report for EP15196096.0 filed Dec. 1, 2016, 20 pgs.
Examination Report for EP15196096.0 dated Jan. 18, 2018, 6 pgs.
Reply to Examination Report for EP15196096.0 filed Sep. 22, 2017, 12 pgs.
Notification of First Office Action dated Dec. 26, 2018 for CN Application No. 201510825216.6 (English and Chinese language), 10 pp.

* cited by examiner

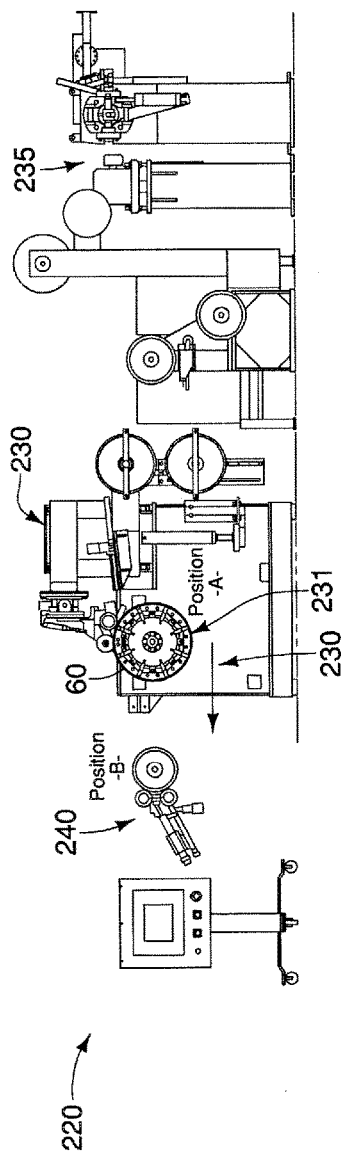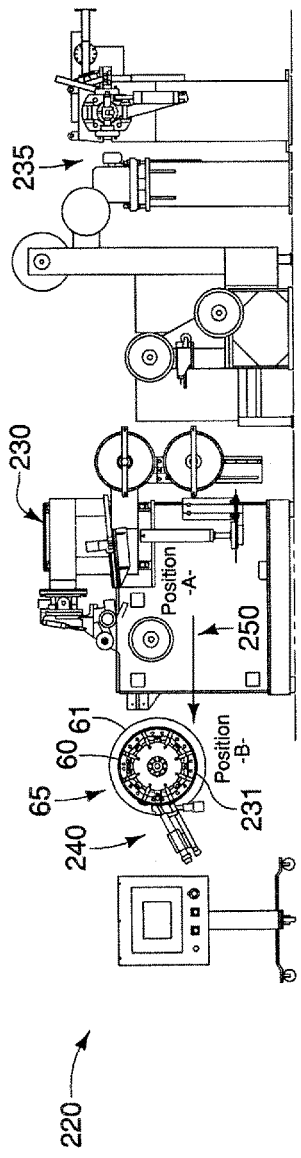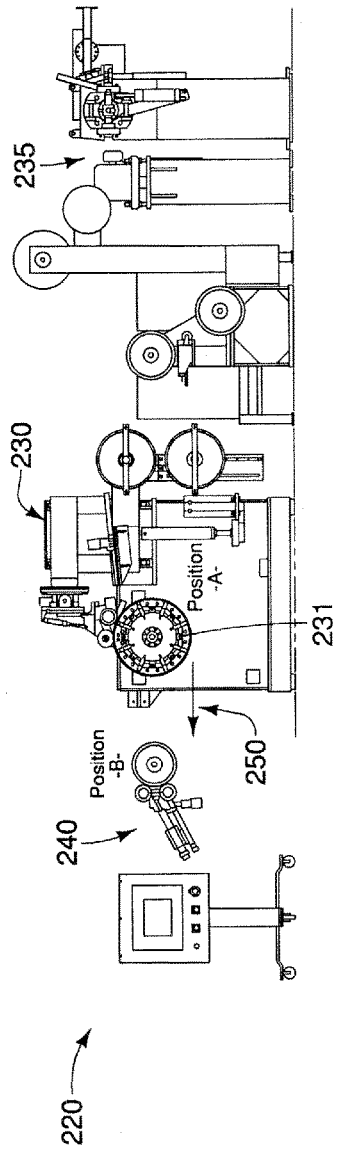

BEAD-APEX ASSEMBLY SYSTEMS

PRIORITY CLAIM

This invention claims the benefit of priority of U.S. Provisional Application Ser. No. 62/084,294, entitled "Bead-Apex Assembly Systems," filed Nov. 25, 2014, the disclosure of which is hereby incorporated by reference in its entirety.

BACKGROUND

A vehicle tire generally has two annular bead rings at the innermost diameter, which provides the tire with hoop strength and structural integrity. The bead rings also provide stiffness at the point where the tire mounts to a rim. Bead rings are generally manufactured by winding metal wire in a groove on the outer periphery of a chuck or drum. Existing equipment is capable of forming a plurality of bead rings on the outer periphery of a single chuck or drum at once. For example, bead rings may be formed on equipment incorporating components from commercially available products such as the SWS-6000 Bead Winding System or the SWS-4000T Bead Winding System, each of which are manufactured by Bartell Machinery Systems, L.L.C. of Rome, N.Y.

The bead ring is often attached to a strip made of rubber or another synthetic material. This strip is generally called an apex or filler. The apex or filler generally is applied to the outer periphery of the bead ring and provides a smooth transitional juncture between each bead and the adjacent side wall of the vehicle tire. An apex is generally applied to a bead ring through the use of automatic rubber extrusion and profiling equipment and equipment for wrapping the apex or filler around the bead ring and seaming the two free ends of the strip together.

Currently, the processes of forming a bead ring and applying an apex or filler to form a bead-apex assembly are distinct and performed on separate equipment. This causes significant material handling and inventory burdens, and significant labor is needed to unload bead rings from bead forming equipment and load them onto apex application equipment. Further, a high degree of repeatability is difficult to achieve due to human involvement in unloading, loading, and transfer between equipment. Separate equipment also consumes a significant amount of floor space.

SUMMARY

In one embodiment, a bead-apex assembly system comprises a bead forming system, an apex application system, and a supporting assembly. The supporting assembly is located at least partially between the bead forming system and the apex application system. The supporting assembly is adapted to move an annular bead ring from the bead forming system to the apex application system. Optionally, the bead-apex assembly system may comprise a plurality of apex application systems.

In one example, when the annular bead ring is moved from the bead forming system to the apex application system, the annular bead ring moves less than fifty feet.

The bead-apex assembly system may additionally comprise a separation system, which may be adapted to position a plurality of bead rings for automatic loading onto a plurality of chucks. The supporting assembly may comprise a rotatable arm coupled to a first chuck. The rotatable arm may further comprise a first end and a second end, the first end coupled to the first chuck, and the second end coupled to a second chuck.

In another embodiment, a bead-apex assembly system comprises an apex application system and a bead forming system comprising a bead former. The bead forming system is adapted to form an annular bead ring on the bead former, and the apex application system is adapted to apply an apex to the annular bead ring while on the bead former.

Other systems, methods, features, and advantages of the invention will be, or will become, apparent to one with skill in the art upon examination of the following figures and detailed description. It is intended that all such additional systems, methods, features, and advantages be within the scope of the invention, and be encompassed by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designated corresponding parts throughout the different views.

FIGS. 7A-7C are side views of a third embodiment of a bead-apex assembly system, with an exemplary sequential positioning of a bead former shown.

DETAILED DESCRIPTION OF THE PREFERRED EMBODIMENTS

Figure 1:
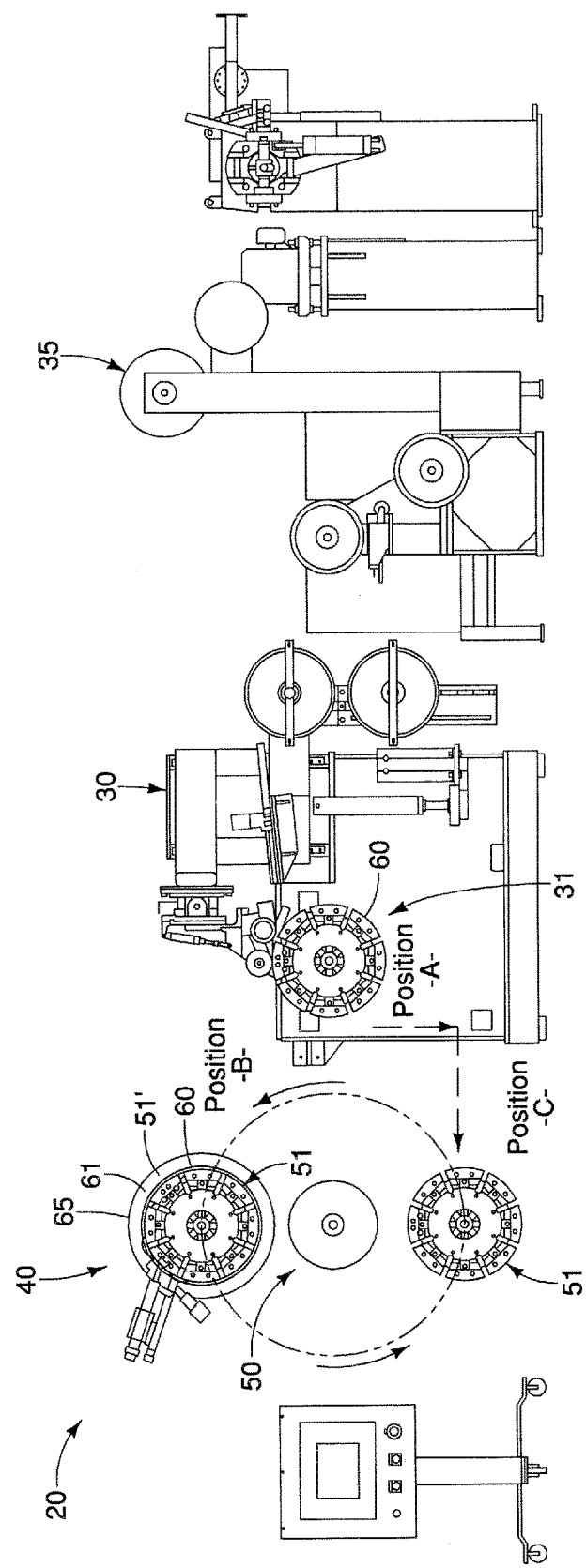
FIG. 1 is a side view of a first embodiment of an exemplary bead-apex assembly system.

The present embodiments generally relate to bead-apex assembly systems comprising a bead forming system and an apex application system. The bead forming system is adapted to form annular bead rings 60. The apex application system is adapted to form a rubber apex 61 and to apply the rubber apex 61 to an outer periphery of bead ring 60 to form bead-apex assembly 65. Each of the embodiments described herein is advantageous over previously-known systems for forming bead-apex assemblies, which generally encompass significant separation of the location and processes of bead formation and apex application. The embodiments described herein advantageously can increase productivity, increase quality due to higher repeatability, reduce overall floor space required for the formation of bead-apex assemblies 65, and reduce the amount of inventoried product.

Referring to FIG. 1, a first embodiment of a bead-apex assembly system 20 comprises wire handling system 35, bead forming system 30, apex application system 40, and chuck supporting assembly 50. Wire handling system 35 may be adapted to feed metal wire to bead forming system 30, and may comprise wire extruding equipment, tension-controlling equipment, and the like. Bead forming system 30 generally comprises equipment and technology for the formation of annular bead ring 60, and may incorporate components from commercially available products such as the SWS-6000 Bead Winding System or the SWS-4000T Bead Winding System, each of which are manufactured by Bartell Machinery Systems, L.L.C. of Rome, N.Y. However, it will be appreciated that other bead formation technology may be used besides these exemplary two systems to assist in formation of bead rings 60.

In the embodiment of FIG. 1, bead forming system 30 operates to form an annular bead ring 60 on bead former 31 at Position A. Bead forming system 30 may form at least one bead ring 60 on bead former 31. Bead ring 60 then may be transferred from the bead former 31 at Position A to Position C, where it is loaded onto chuck supporting assembly 50.

Figure 2:
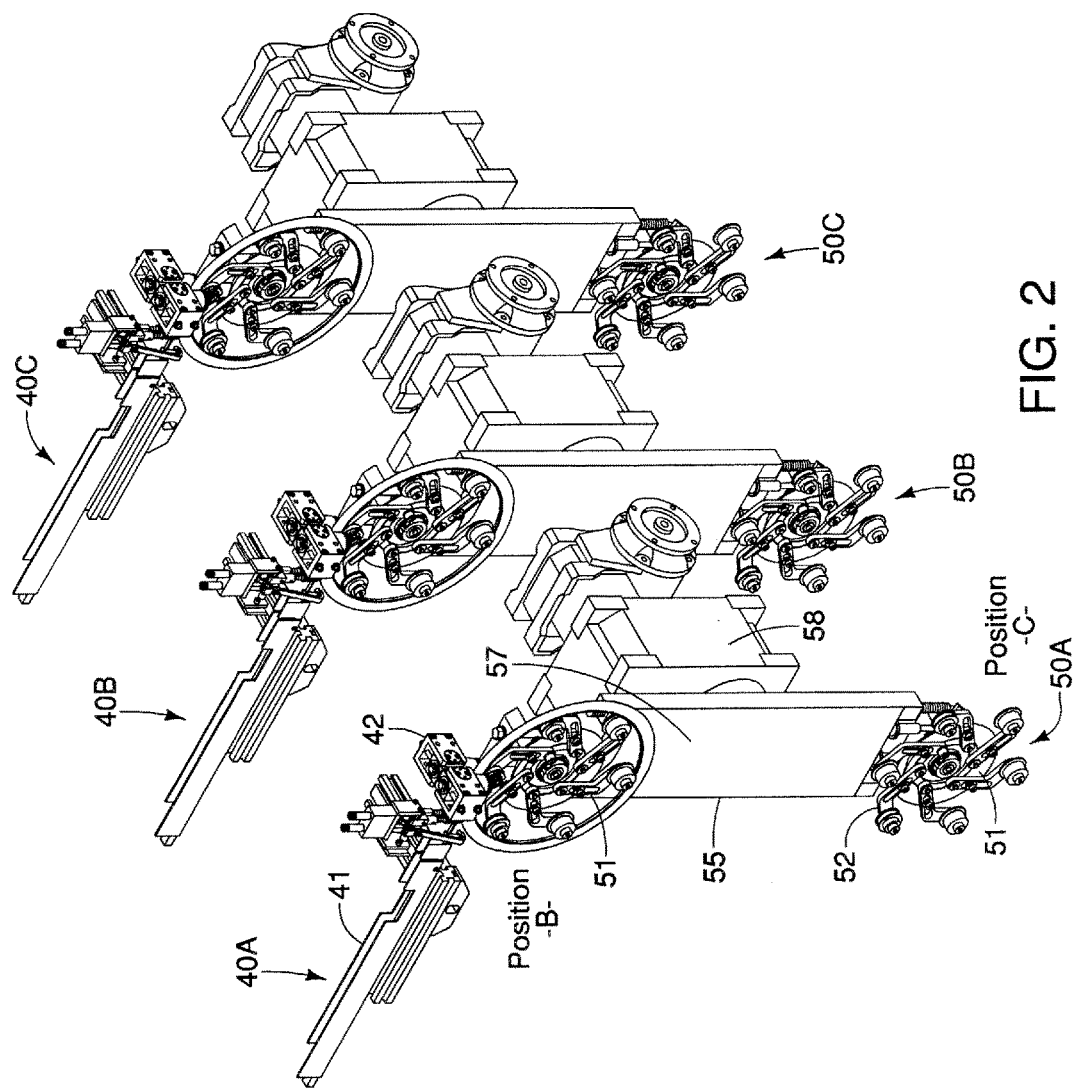
FIG. 2 is a perspective view of three parallel chuck supporting assemblies and three corresponding apex application systems comprising apex applicators.

Referring to FIG. 2, an exemplary chuck supporting assembly 50A comprises turret arm 55 with a first end 56 and a second end 57, and rotation system 58. Turret arm 55 is rotatable with respect to bead forming system 30 (shown in FIG. 1) and apex application system 40A, with rotation system 58 providing the rotational motion. Rotation system 58 is depicted in FIG. 2 as an electric motor with an output shaft coupled to turret arm 55, but alternatively may be any other suitable system for moving bead rings 60. Chuck supporting assembly 50A additionally comprises at least one supporting chuck 51. In one example, supporting chuck 51 is a center expanding chuck for gripping a bead ring 60 as disclosed by U.S. Patent Application Publication No. 2014/0265400 A1 to Gorham ("Gorham"), which is incorporated by reference herein in its entirety.

Figure 3:
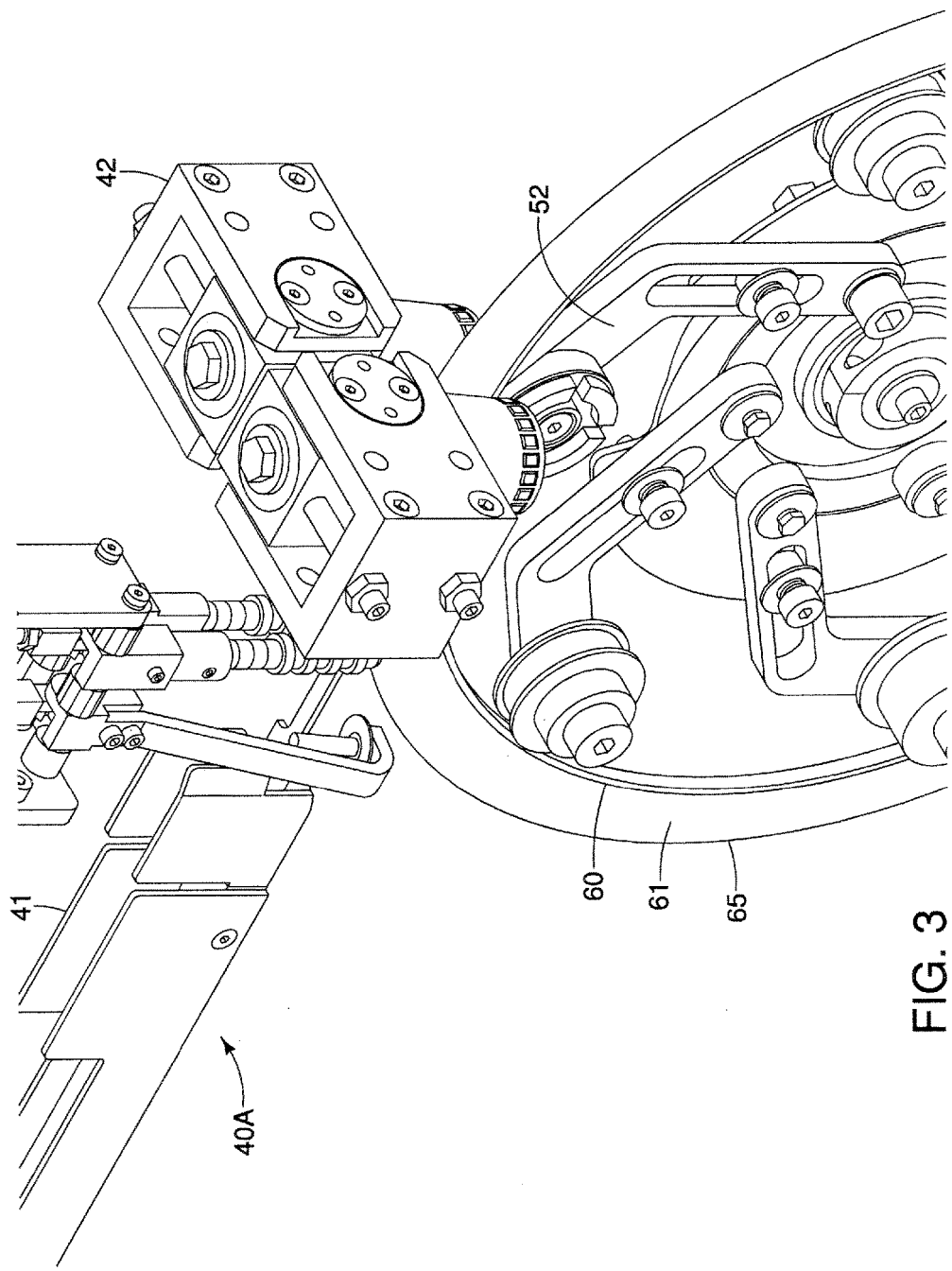
FIG. 3 is a perspective view showing features of an exemplary apex application.

As best shown by FIG. 3, and in a manner similar to Gorham, a plurality of chuck arms 52 are adapted to move radially outward to grip an inner surface of annular bead ring 60, thereby coupling bead ring 60 to turret arm 55. Turret arm 55 may then rotate to move loaded bead ring 60 to Position B for communication with apex application system 40A.

Apex application system 40A is a system for applying an apex 61 to bead ring 60 to form bead-apex assembly 65, Apex application system 40A generally comprises equipment for the formation of apex 61, for example through the use of automatic rubber extrusion and profiling equipment. Further, apex application system 40A comprises equipment, shown as apex applicator 42, for applying apex 61 to the outer periphery of the bead ring 60.

Apex application system 40A may incorporate components from commercially available apex application systems to the extent it relates to coupling an apex around a bead ring and securing the free ends of the apex. However, in the present embodiments, apex application system 40A may comprise additional or modified equipment relative to existing technology, including but not limited to arm 41, which is adjustable or extendable to position apex applicator 42 within proper communication with bead ring 60, for purposes described in greater detail below.

Referring back to FIG. 2, turret arm 55 may be adjustable or extendable to position bead ring 60 in communication with apex applicator 42 at Position B. Alternatively, or in addition, apex application system 40A may comprise the arm 41 that is adjustable or extendable to position apex applicator 42 within proper communication with bead ring 60. The apex 61 then may be applied to the outer periphery of the bead ring 60.

After formation of bead-apex assembly 65, turret arm 55 may then rotate to position the supporting chuck 51 at Position C for unloading. Bead-apex assembly 65 may be either automatically or manually unloaded from supporting chuck 51 at this position. Alternatively, the bead-apex assembly 65 may be unloaded at any position within the reach of the chuck supporting assembly 50A.

The chuck supporting assembly 50A may comprise multiple supporting chucks 51, 51'. In the embodiment shown in FIGS. 1-2, the first end 56 of the turret arm 55 is coupled to the supporting chuck 51 and the second end 57 is coupled to the supporting chuck 51'. Turret arm 55, when positioned as depicted by FIG. 2, positions one supporting chuck 51, preferably loaded with bead ring 60, at a Position B for communication with apex application system 40A. As shown, turret arm 55 simultaneously positions a second supporting chuck 51' at Position C for the respective loading or unloading of bead rings 60 or bead-apex assemblies 65. Turret arm 55 may be rotated to selectively position supporting chucks 51, 51' at Position A, Position B, Position C, or any other position within reach of chuck supporting assembly 50A. The current embodiment is advantageous because the loading of bead ring 60 and unloading of bead-apex assembly 65 may be performed simultaneously with the formation of bead-apex assembly 65, thereby saving time and increasing the efficiency of the process.

Alternatively, chuck supporting assembly 50A may comprise a plurality of turret arms, each arm comprising at least one end portion coupled to a supporting chuck 51. Another alternative embodies a rotatable body adapted to couple to a plurality of supporting chucks 51. These embodiments are advantageous when it is desired to have more than two supporting chucks for the selective positioning of a plurality of bead rings 60 and bead-apex assemblies 65.

Further, bead-apex assembly system 20 may comprise a plurality of chuck supporting assemblies, as best shown by the embodiment of FIG. 2 incorporating three chuck supporting assemblies 50A, 50B, 50C. Such an embodiment is advantageous when it is desired to form multiple bead-apex assemblies at once. In this embodiment, three chuck supporting assemblies 50A, 50B, 50C correspond with three apex application systems 40A, 40B, 40C.

Figure 4:
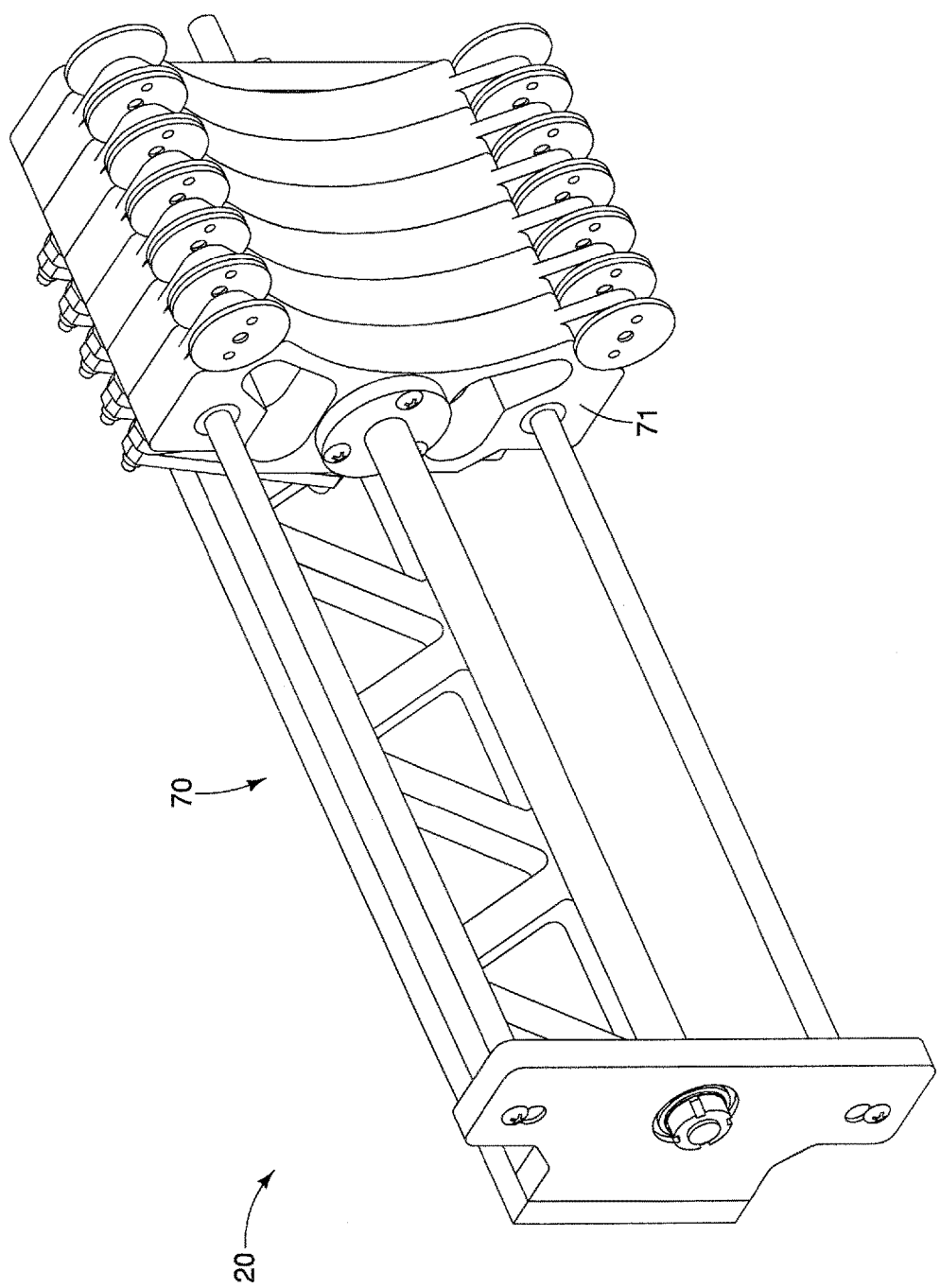
FIG. 4 is a perspective view of a separation system with gripping elements located relatively close together.
Figure 5:
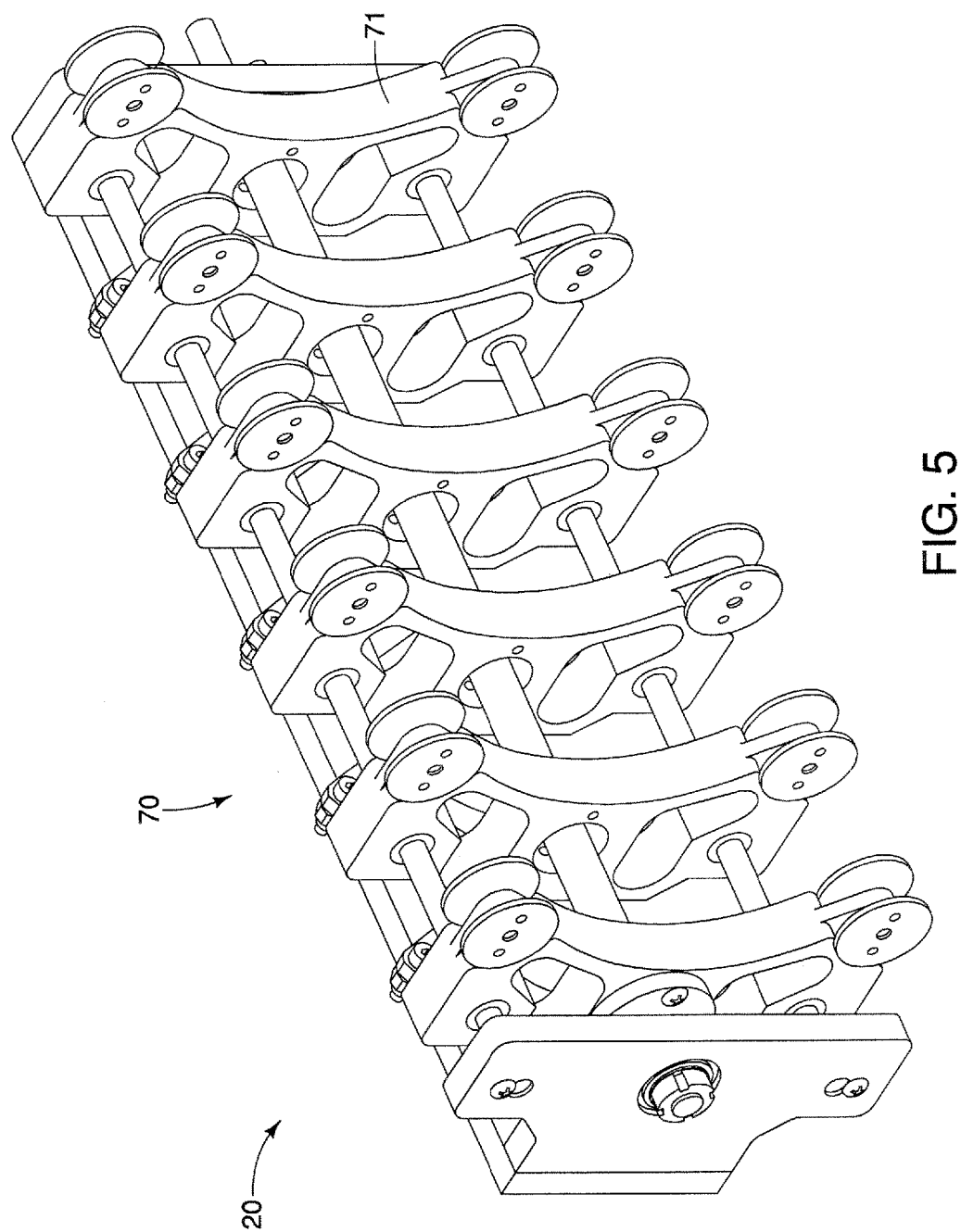
FIG. 5 is a perspective view of the separation system of FIG. 4 with the gripping elements separated.

Generally referring to FIGS. 4-5, the bead-apex assembly system 20 may comprise a separation system 70 adapted for positioning bead rings 60 (not shown in FIG. 4) for loading on to a plurality of supporting assemblies 50A, 50B, 50C (as depicted by FIG. 2). A separation system 70 is advantageous when a plurality of bead rings 60 are formed on bead former 31 (see FIG. 1) in parallel and relatively close together. Separation system 70 may be an accordion-type spreading device comprising a plurality of gripping elements 71. Gripping elements 71 may be positioned relatively close together in a first state, as depicted in FIG. 4, to grip a plurality of simultaneously formed, parallel positioned bead rings 60 from bead former 31, and then separated in a second state, as depicted in FIG. 5, such that a plurality of bead rings 60 is positioned for automatic loading onto the plurality of chuck supporting assembly 50A, 50B, 50C (see FIG. 2). Separation system 70 may be further moveable and adapted to unload formed bead rings 60 from bead former 31 (see FIG. 1) and transport bead rings 60 to a position for loading onto chuck supporting assembly 50.

In the embodiment of FIGS. 1-5, it should be noted that the bead forming system 30 and the apex application system 40A advantageously are in relatively close proximity. Further, the handling and transfer of bead ring 60 is substantially automated, thereby decreasing the need for human labor and increasing repeatability.

Advantageously, the bead ring 60 does not travel far between bead forming and apex application. By way of example, and without limitation, in one embodiment the bead ring 60 travels less than fifty feet between the bead forming and apex application locations, e.g., bead former 31 to apex applicator 42. In the embodiments disclosed, the bead ring 60 can travel less than twenty feet between the bead former 31 to apex applicator 42. Such a small travel distance of less than fifty feet, or even less than twenty feet, is possible with the arrangement of the present embodiments and provides a significant improvement over previous arrangements where a considerably longer travel distance occurs, e.g., often across the length of an entire factory or different facilities altogether between these particular bead forming and apex applicator steps. It will also be appreciated that many handling steps are reduced or eliminated by the embodiment of FIGS. 1-5, and the processes of bead formation and apex application may be done at substantially the same time.

Figure 6:
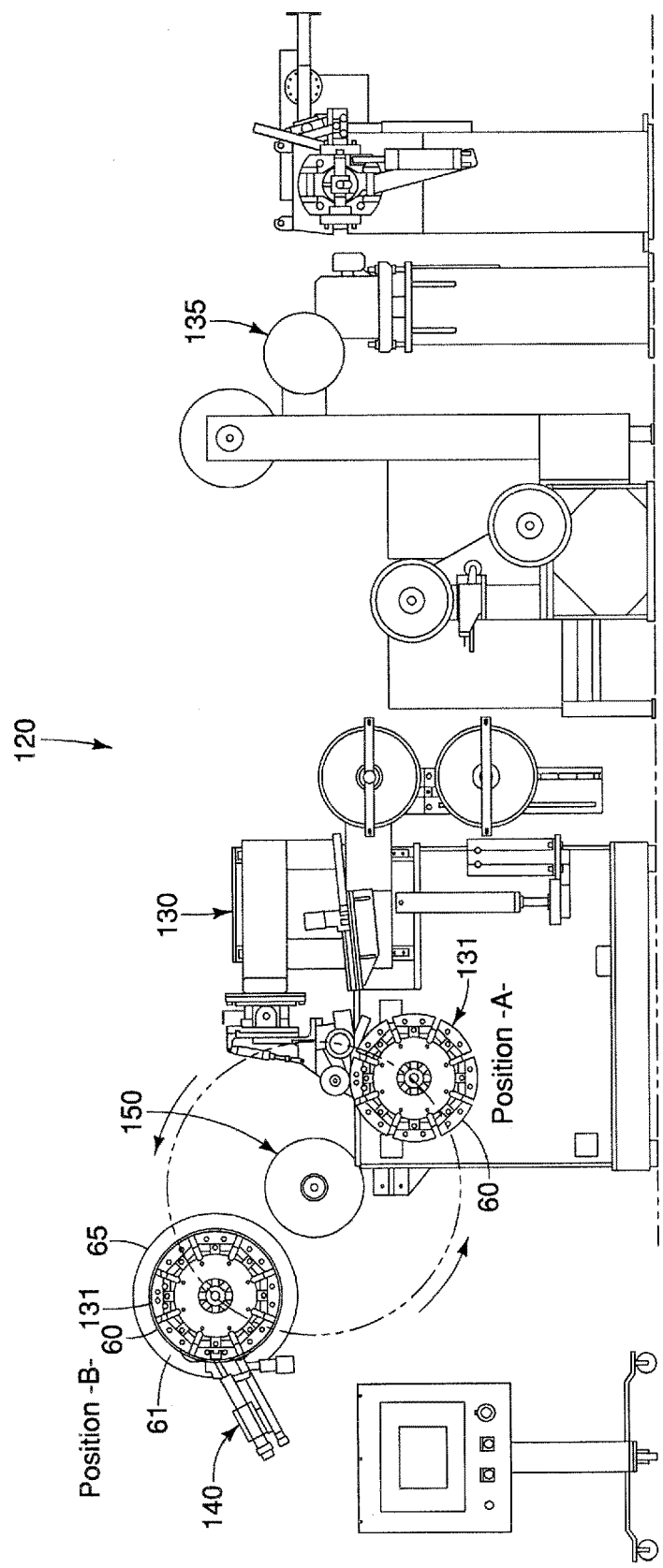
FIG. 6 is a side view of a second embodiment of a bead-apex assembly system.

Referring now to FIG. 6, in another embodiment, an alternative bead-apex assembly system 120 is similar to the bead-apex assembly system 20 of FIG. 1, with main differences noted below. The bead-apex assembly 120 comprises bead forming system 130 with a bead former 131. Bead forming system 130 operates to form an annular bead ring 60 on bead former 131 at Position A. Bead forming system 130 may form a plurality of bead rings 60 on bead former 131 simultaneously. Further, bead-apex assembly system 120 comprises chuck supporting assembly 150 for the supporting and transporting of bead former 131.

After formation of bead ring 60, chuck supporting assembly 150 moves loaded bead former 131 from a bead formation position (Position A) to an apex application position (Position B), where bead former 131 may communicate with the apex application system 140. Apex application system 140 may be adapted for the proper communication with bead former 131, thereby applying apex 61 to bead ring 60 to form bead-apex assembly 65 on bead former 131.

After apex application, chuck supporting assembly 150 may move bead former 131 to a position for unloading. The unloading position may be at any position within the reach of chuck supporting assembly 150, including the position where beads 60 are formed (Position A). If required, unloaded bead former 131 may be transported back to Position A for use during the formation of one or more bead rings 60.

Further, chuck supporting assembly 150 may support a plurality of bead formers 131 at once, thereby allowing for the supporting of a plurality of bead rings 60 and bead-apex assemblies 65 at once. Bead-apex assembly system 120 can also include multiple parallel chuck supporting assemblies, in a spacing manner similar to what is depicted in FIG. 2 above, thereby allowing for multiple parallel apex application systems to form multiple bead-apex assemblies 65 at once. Further, the bead forming system 120 and apex application system 140 are in close proximity, and the transport distance of bead former 131 is small, preferably less than fifty feet, or even less than twenty feet, as explained above with respect to the embodiment of FIGS. 1-5.

Referring to FIGS. 7A-7C, a further alternative bead-apex assembly system 220 comprises wire handling equipment 235, bead forming system 230, transfer shuttle system 250, and apex application system 240. Bead forming system 230 operates to form an annular bead ring 60 on bead former 231 at Position A. Bead forming system 230 may form a plurality of bead rings 60 on bead former 231 simultaneously. Further, the transfer shuttle system 250 is used for the transfer of bead former 231 from a bead formation position (Position A) to an apex application position (Position B), as shown between FIGS. 7A-7B. Apex application system 240 may also be adapted for proper communication with bead former 231, for example, as explained with respect to FIG. 1, above. As previously described, apex application system 240 forms and applies apex 61 to bead ring 60, forming bead-apex assembly 65. Bead-apex assembly 65 may be unloaded automatically or manually at any position along transfer shuttle system 250. If required, unloaded bead former 231 may be transferred by the transfer shuttle system 250 back to Position A for use during the formation of additional bead rings 60, as generally depicted in FIG. 7C. Transfer shuttle system 250 may comprise equipment for moving bead former 231, including, for example, a linear actuator operated using pneumatic or hydraulic actuators, or the like. Like the previous embodiments, the transfer distance of bead ring 60 on bead former 231 is small (between the bead forming step and the apex application step), preferably less than fifty feet, or even less than twenty feet, as explained above.

Figure 8:
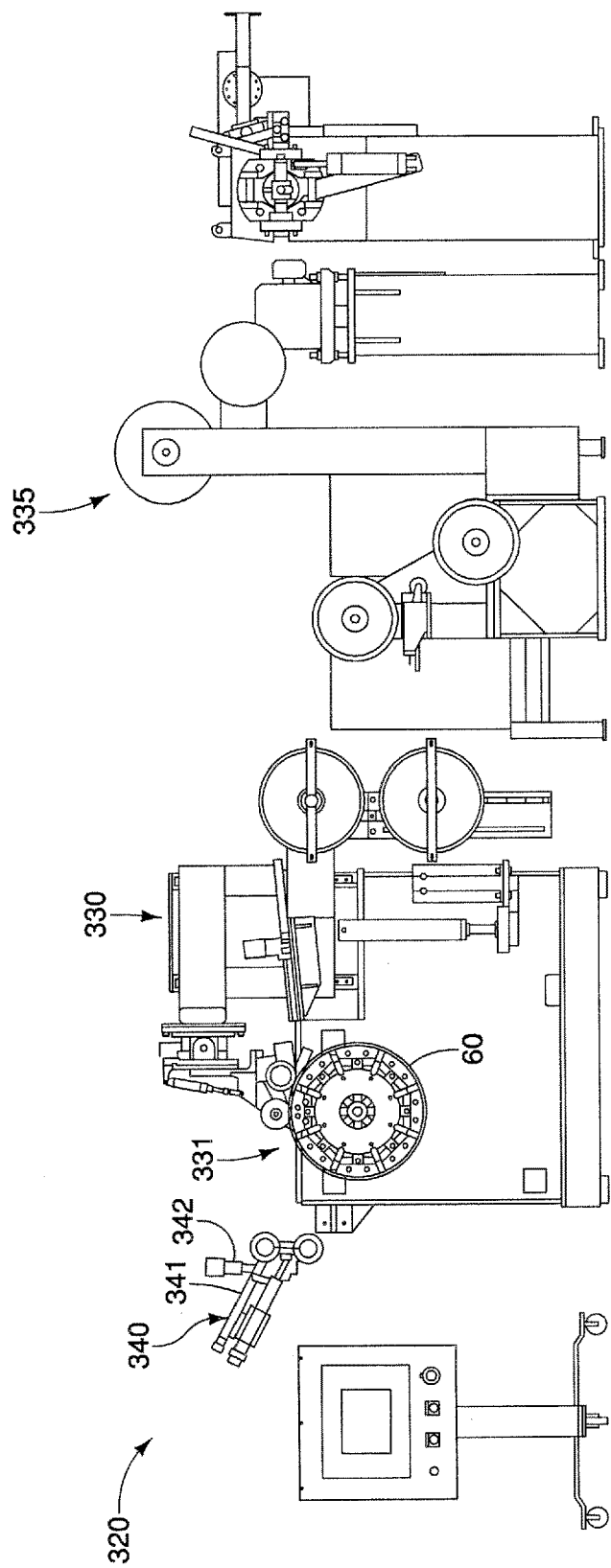
FIG. 8 is a side view of a fourth embodiment of a bead-apex assembly system.

In another embodiment, as best shown by FIG. 8, a further alternative bead-apex assembly system 320 comprises bead forming system 330 and apex application system 340. Bead forming system 330 forms bead rings 60 on bead former 331, and may form a plurality of bead rings 60 on bead former 331 simultaneously, as generally described above. Apex application system 340 comprises arm 341 and apex applicator 342. After formation of a bead ring 60, an actuation system coupled to arm 341 moves the apex applicator 342 into a position such that it may engage with bead ring 60 to apply apex 61 to form bead-apex assembly 65. Further, bead-apex assembly system 320 may include a plurality of movable apex applicators 342 for the formation of multiple bead-apex assemblies 65 at once. This embodiment is advantageous because it removes the need for unloading equipment to unload and separate bead rings 60, thereby saving space, time, and reducing costs. In this embodiment, bead ring 60 stays in substantially the same location during the bead forming process and the apex application process.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

We claim:

1. A bead-apex assembly system, comprising:
   a bead forming system;
   an apex application system; and
   a supporting assembly; and
   a separation system, the separation system including at least a first gripping element and a second gripping element configured to grip respective annular bead rings formed on a bead former of the bead forming system,
   wherein the supporting assembly is located at least partially between the separation system and the apex application system,
   wherein the supporting assembly includes a rotatable arm coupled to a chuck, wherein the chuck that is separate from, and movable relative to, the bead former of the bead forming system and the first and second gripping elements of the separation system, wherein the first gripping element is movable axially relative to the second gripping element such that it is configured to space the respective annular bead rings in an axial direction such that they are positioned for receipt by the supporting assembly, and wherein the supporting assembly includes at least two chucks for moving the respective annular bead rings from the separation system to the apex application system.

2. The bead-apex assembly system of claim 1, wherein when the respective annular bead ring is moved from the bead forming system to the apex application system, the respective annular bead ring moves less than fifty feet.

3. The bead-apex assembly system of claim 1, wherein the at least first and second gripping elements of the separation system are configured to unload the respective annular bead ring from the bead former.

4. The bead-apex assembly system of claim 1, wherein the bead-apex assembly system comprises a plurality of apex application systems.

5. The bead-apex assembly system of claim 1, wherein the rotatable arm comprises a first end and a second end, the first end coupled to the chuck, and the second end coupled to a second chuck.

\* \* \* \* \*